UNITED STATES PATENT OFFICE.

JAMES M. JACOBS, OF BLUFF CREEK, INDIANA, ASSIGNOR TO J. M. JACOBS & SON, OF SAME PLACE.

MEDICINE FOR DYSPEPSIA.

SPECIFICATION forming part of Letters Patent No. 282,898, dated August 7, 1883.

Application filed July 5, 1883. (No specimens.)

*To all whom it may concern:*

Be it known that I, JAMES M. JACOBS, of Bluff Creek P. O., county of Johnson, and State of Indiana, have invented certain new and useful Improvements in Medicines for Dyspepsia, &c., of which the following is a specification.

The object of my said invention is to produce a new medicine for the treatment of persons afflicted with indigestion, or the disease known as "dyspepsia;" and it consists of the compound or mixture hereinafter described, viz.: extract of white-walnut bark, twelve parts; extract of dogwood-bark, three parts; extract of wild-cherry bark, three parts; New Orleans molasses, six parts; spirits, eight parts.

I produce the several extracts named in the following manner: Take the bark, fresh and of good quality, and boil it down until the strength is well extracted. Then strain the decoction until freed from the bark and dregs, so as to be clear. Finally, boil down until a thin sirup is produced.

The following will illustrate the exact method of producing this medicine, being directions for producing about three and three-fourth gallons of the same. Take of the white-walnut bark twenty pounds, of the dogwood-bark five pounds, and of the wild-cherry bark five pounds. Place the several barks separately in kettles, and add to each as many gallons of water as there are pounds of bark, and boil each down about one-fourth. Enough water is then added to restore it to the original amount, and the boiling is continued until the liquid is reduced about three-fourths. The barks are then taken out, the liquids strained clear, and all placed together, (making about seven and one-half gallons in bulk,) and again boiled until reduced to two gallons. About three quarts of best New Orleans molasses is then added while the mixture is still hot, and afterward (usually during the process of filling the bottles) about four quarts of best whisky. The whisky, however, being simply for preserving the mixture, may be varied considerably in amounts, and other kinds of spirits, as alchohol, may be used instead.

The formula above described should be substantially followed, though in some cases the bark extracts are to be made stronger than in others, according to the severity of the disease or the condition of the patient.

This medicine I have used with great success in the treatment of the disorders named, and have thus proved it to be of great value.

Having thus fully described my said invention, what I claim as new, and desire to secure by Letters Patent, is—

A medicine for dyspepsia, &c., composed of extracts of the barks of white walnut, dogwood, and cherry, New Orleans molasses, and spirits, in substantially the proportions specified.

In witness whereof I have hereunto set my hand and seal, at Indianapolis, Indiana, this 13th day of March, A. D. 1883.

JAMES M. JACOBS. [L. S.]

Witnesses:
C. BRADFORD,
E. W. BRADFORD.